US006454445B1

(12) United States Patent
Liaw et al.

(10) Patent No.: US 6,454,445 B1
(45) Date of Patent: Sep. 24, 2002

(54) SELF-ILLUMINATING PEDAL ASSEMBLY

(75) Inventors: Shun-Ten Liaw, Yun Lin Hsien (TW); Wu-Chung Jung, Yun Lin Hsien (TW)

(73) Assignee: Cobra King Industry Co., Ltd., Yun Lin Hsien (TW)

( * ) Notice: Subject to any disclaimer, the term of this patent is extended or adjusted under 35 U.S.C. 154(b) by 0 days.

(21) Appl. No.: 09/835,724

(22) Filed: Apr. 16, 2001

(51) Int. Cl.[7] .................................................. B62J 6/20

(52) U.S. Cl. ....................... 362/473; 362/192; 362/500; 310/67 R

(58) Field of Search ................................ 362/192, 193, 362/249, 800, 473, 500; 340/432, 480; 310/67 R, 73

(56) References Cited

U.S. PATENT DOCUMENTS 3,802,292 A * 4/1974 Haberkorn et al. ........ 74/594.4
4,648,610 A * 3/1987 Hegyi ..................... 280/11.19
4,662,405 A * 5/1987 Besche et al. .............. 138/124
5,975,768 A * 11/1999 Hoffman et al. ............ 384/545
6,104,096 A * 8/2000 Hicks ......................... 180/205

FOREIGN PATENT DOCUMENTS

FR 2455543 A * 1/1981 ........... B62K/19/34

* cited by examiner

*Primary Examiner*—Sandra O'Shea
*Assistant Examiner*—Hargobind S. Sawhney
(74) *Attorney, Agent, or Firm*—Alan Kamrath; Rider, Bennett, Egan & Arundel, LLP

(57) ABSTRACT

A self-illuminating pedal assembly comprises a pedal axle, a pedal rotatably mounted around the pedal axle, a magnet securely mounted to the pedal axle, and a permanent-magnet coil securely mounted to the pedal to rotate therewith. At least one light-emitting diode is mounted to the pedal. The permanent-magnet coil is electrically connected to the light-emitting diode and surrounds the magnet. When pedaling, the permanent-magnet coil is rotated relative to the magnet to thereby generate an alternating magnetic field to cause illumination of the light-emitting diode.

27 Claims, 5 Drawing Sheets

40 10 33 4 312 43 30 20 32 55 51 50 54 53 4

SELF-ILLUMINATING PEDAL ASSEMBLY

BACKGROUND OF THE INVENTION

1. Field of the Invention

The present invention relates to a self-illuminating pedal assembly and more particularly to a pedal having a plurality of light-emitting diodes mounted thereon for illumination while pedaling.

2. Description of the Related Art

A bicycle pedal generally has two opposed retro-reflective plates mounted thereto for providing an alarm effect in the night. However, the reflective effect is not always good. Illuminating devices empowered by batteries have been proposed, yet additional cost is incurred and the used batteries require handling in order not to cause environmental problems. The present invention is intended to provide a self-illuminating pedal assembly that mitigates and/or obviates the above problems.

SUMMARY OF THE INVENTION

It is the primary object of the present invention to provide a self-illuminating pedal assembly, wherein a plurality of light-emitting diodes mounted on a pedal illuminates while pedaling.

A self-illuminating pedal assembly comprises:

a pedal axle;

a pedal rotatably mounted around the pedal axle, at least one light-emitting means being mounted to the pedal;

a magnet securely mounted to the pedal axle; and a permanent-magnet coil securely mounted to the pedal to rotate therewith, the permanent-magnet coil being electrically connected to said at least one light-emitting means, the permanent-magnet coil surrounding the magnet;

wherein when pedaling, the permanent-magnet coil being rotated relative to the magnet generates an alternating magnetic field to cause illumination of said at least one light-emitting means.

The light-emitting means may be a light-emitting diode and the magnet may be a ring magnet securely mounted around the pedal axle.

In an embodiment of the invention, the pedal includes a compartment for securely receiving the permanent-magnet coil. An inner periphery defining the compartment includes at least one positioning groove, and the permanent-magnet coil includes at least one protrusion on an outer periphery thereof for engaging with the positioning groove.

The pedal includes a longitudinal through-hole through which the pedal axle extends. The longitudinal through-hole includes two ends each having an enlarged receiving portion for receiving a bearing through which the pedal axle extends. The pedal axle includes an end adapted to engage with a crank of a bicycle. The pedal axle further includes a flange. A cover is mounted around the pedal axle and has a side bearing against the flange and includes a pair of holed ears. Two screws are respectively extended through the holed ears of the cover and two holed lugs of the pedal, thereby housing the permanent-magnet coil and the ring magnet.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
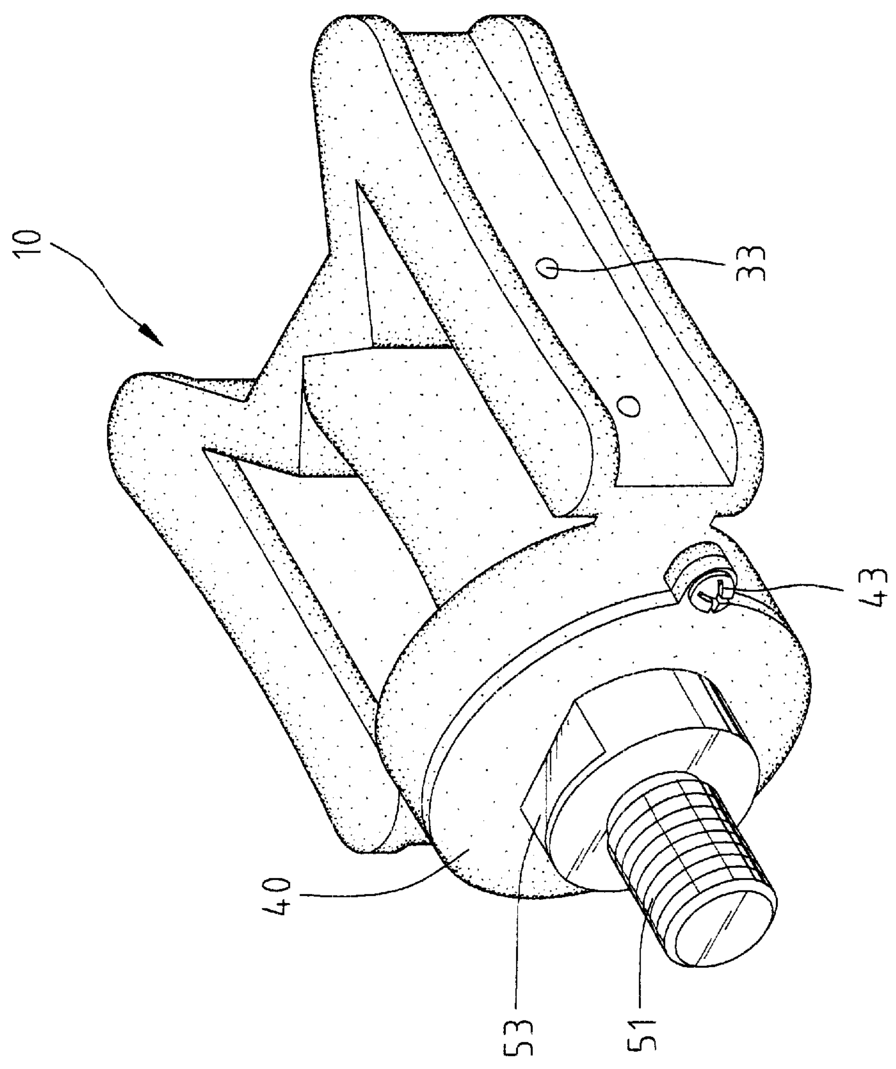
FIG. 1 is a perspective view of a self-illuminating pedal assembly in accordance with the present invention.
Figure 2:
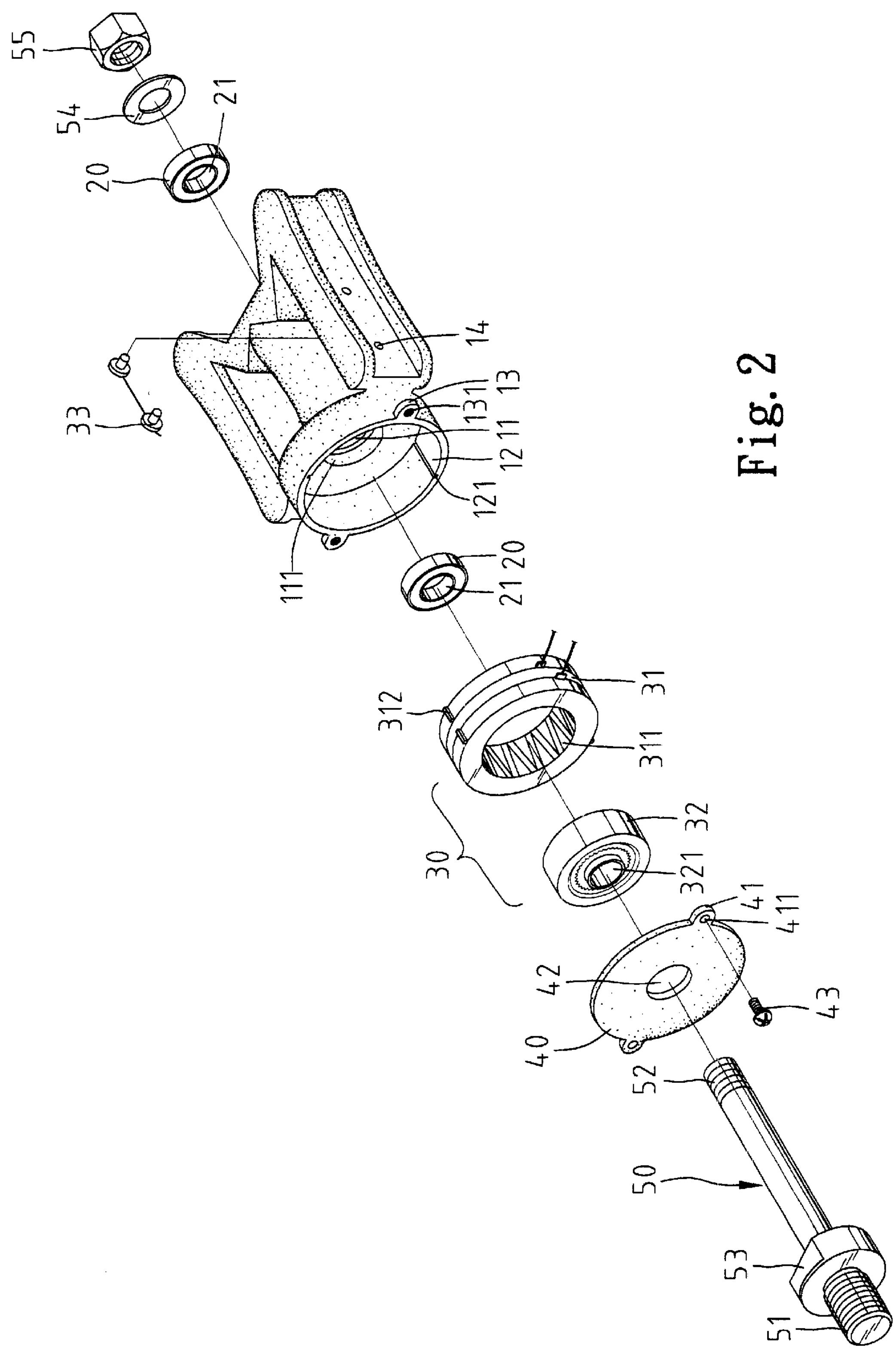
FIG. 2 is an exploded perspective view of the self-illuminating pedal assembly in accordance with the present invention.

Referring to FIGS. 1 and 2, a self-illuminating pedal assembly in accordance with the present invention generally includes a pedal 10, a generator 30, and a pedal axle 50. The pedal 10 includes a longitudinal through-hole 11 through which the pedal axle 50 extends, thereby rotatably mounting the pedal 10 around the pedal axle 50. The longitudinal through-hole 11 of the pedal 10 includes two ends each having an enlarged receiving portion 111 for receiving a bearing 20. Each bearing 20 includes a hole 21 through which the pedal axle 50 extends. A washer 54 and a nut 55 are attached to a threaded end 52 of the pedal axle 50 to prevent disengagement of the pedal assembly. The pedal 10 further includes a plurality of holes 14 in two opposite sides thereof, each hole 14 having a light-emitting diode 33 mounted therein.

The pedal 10 further includes a compartment 12 outside the longitudinal through-hole 11 yet communicated with the longitudinal through-hole II. The generator 30 is received in the compartment 12 and includes a permanent-magnet coil 31 and a ring magnet 32 surrounded by the permanent-magnet coil 31. The permanent-magnet coil 31 includes a central hole 311 for receiving the ring magnet 32, which, in turn, includes a central hole 321 through which the pedal axle 50 extends. The permanent-magnet coil 31 is electrically connected to the light-emitting diodes 33 in the pedal 10. The permanent-magnet. coil 31 includes a plurality of protrusions 312 on an outer periphery thereof for securely engaging with positioning grooves 121 in an inner periphery defining the compartment 12. Thus, the permanent-magnet coil 31 is securely attached to the pedal 10 to rotate therewith.

Figure 3:
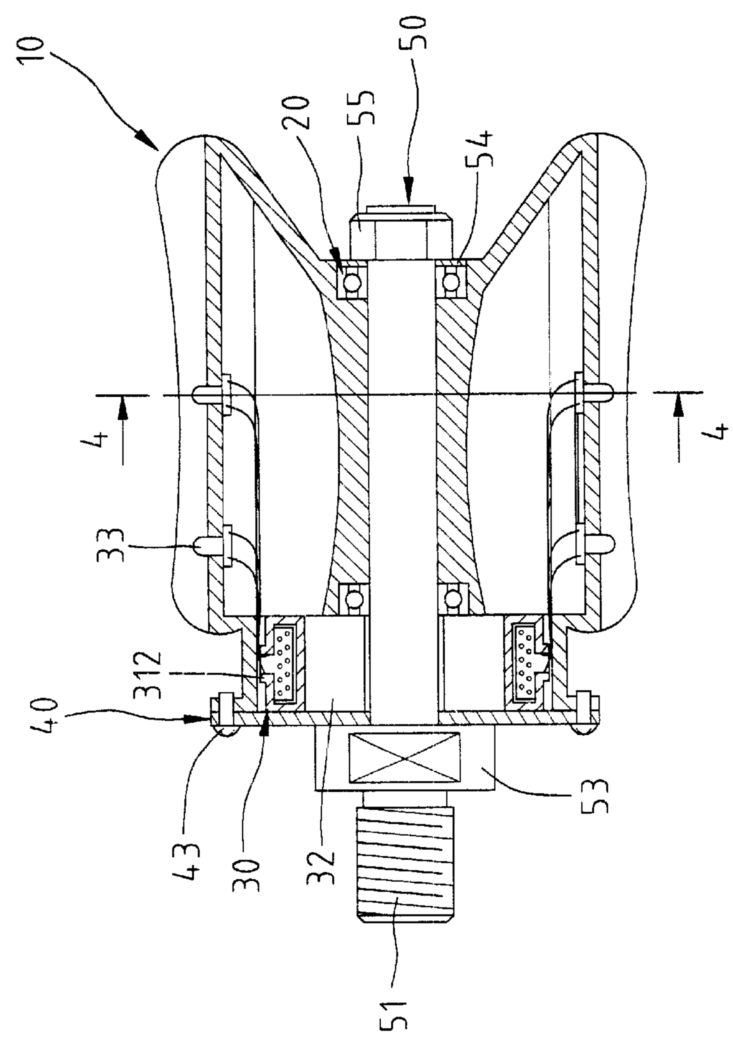
FIG. 3 is a longitudinal sectional view of the self-illuminating pedal assembly in accordance with the present invention.

The other end 51 of the pedal axle 50 is also threaded for connection with a crank 61 (FIG. 6) of a bicycle 60. A flange 53 is formed on the pedal axle 50. A cover 40 includes a central hole 42 so as to be mounted around the pedal axle 50. The cover 40 is retained in place by bearing against the flange 53 and includes two ears 41. A screw 43 is extended through a hole 411 in each ear 41 and a hole 131 of an associated lug 13 on the pedal 10. Thus, the cover 40 is attached to a side of the pedal 10 for housing the generator 30, best shown in FIG. 3.

Figure 5:
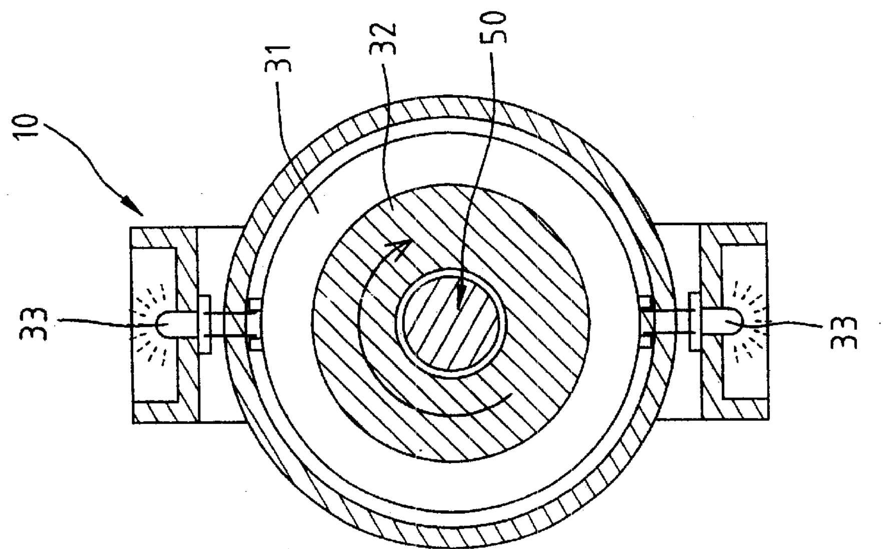
FIG. 5 is a sectional view similar to FIG. 4, wherein a pedal axle of the self-illuminating pedal assembly is turned.
Figure 4:
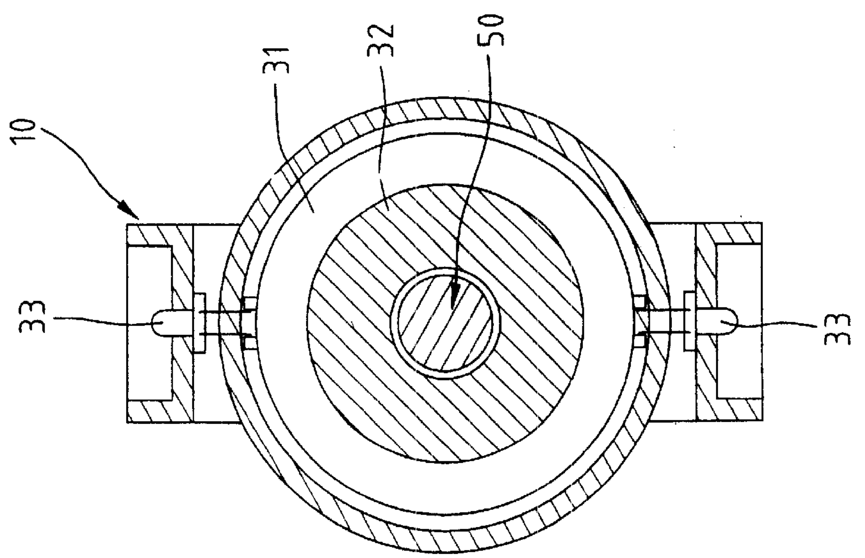
FIG. 4 is a sectional view taken along line 4—4 in FIG. 3.
Figure 6:
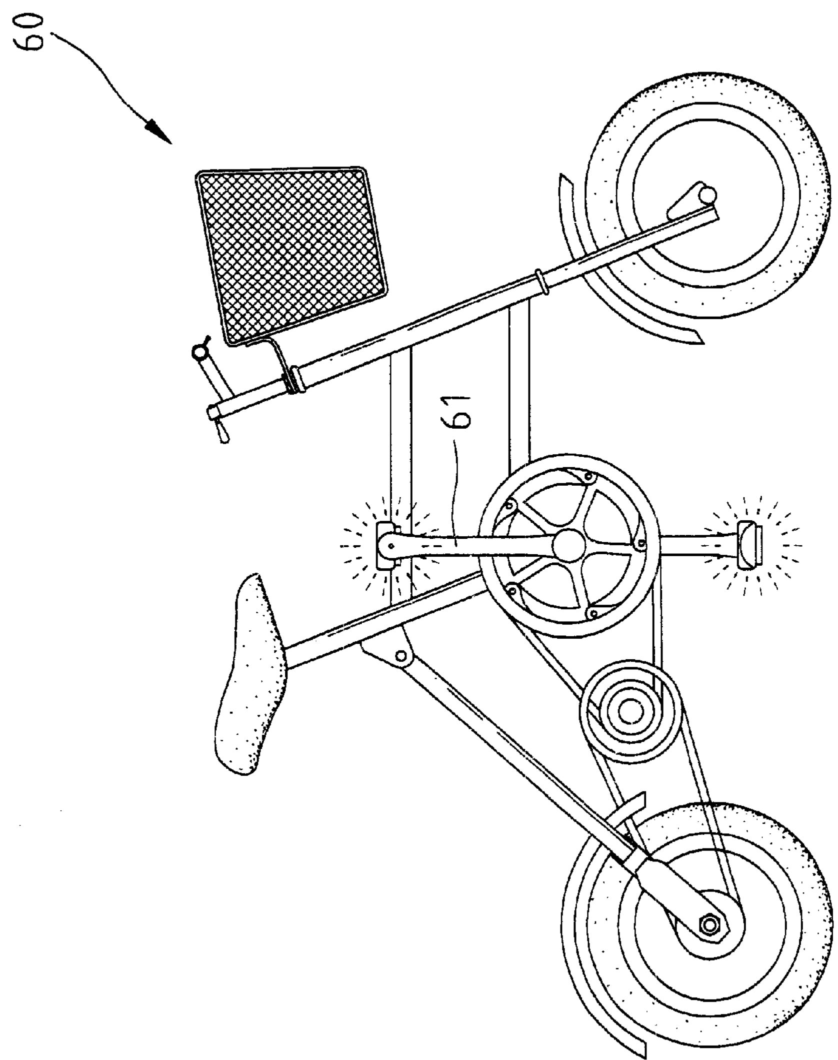
FIG. 6 is a schematic view of a bicycle equipped with the self-illuminating pedal assemblies in accordance with the present invention.

The ring magnet 32 in FIG. 4 is stationary relative to the permanent-magnet coil 31. Referring to FIG. 5, when the ring magnet 32 is rotated relative to the permanent-magnet coil 31, an alternating magnetic field is generated, which, in team, generates electric current. The light-emitting diodes 33 electrically connected to the permanent-magnet coil 31 illuminate accordingly. Referring to FIG. 6, in actual cycling, the pedal is turned relative to the pedal axle 50 during pedaling, the permanent-magnet coil 31 is thus rotated relative to the ring magnet 32. The light-emitting diodes 33 electrically connected to the permanent-magnet coil 31 illuminate accordingly.

According to the above description, it is appreciated that the light-emitting diodes 33 illuminate while pedaling, thereby providing an alarming effect. No batteries are required. In addition, the overall structure and assembly of the self-illuminating pedal assembly in accordance with the present invention are simple, and the cost therefor is low.

Although the invention has been explained in relation to its preferred embodiment, it is to be understood that many other possible modifications and variations can be made without departing from the scope of the invention as hereinafter claimed.

What is claimed is:

1. A self-illuminating pedal assembly comprising:

a pedal axle;

a pedal rotatably mounted around the pedal axle, with the pedal including a longitudinal through-hole through which the pedal axle extends, with the longitudinal through-hole including a first end and a second end each having a enlarged receiving portion for receiving a bearing through which the pedal axle extends, with the pedal including a compartment, with the enlarged receiving portion of the first end of the longitudinal through-hole terminating in the compartment and located intermediate the second end of the longitudinal through-hole and the compartment;

at least one light-emitting means being mounted to the pedal;

a magnet securely mounted to the pedal axle; and a permanent-magnet coil securely mounted to the pedal to rotate therewith, with the permanent-magnet coil being received in the compartment, with the permanent-magnet coil being electrically connected to said at least one light-emitting means, the permanent-magnet coil surrounding the magnet;

wherein when pedaling, the permanent-magnet coil is rotated relative to the magnet to thereby generate an alternating magnetic field to cause illumination of said at least one light emitting means.

2. The self-illuminating pedal assembly as claimed in claim 1, wherein said at least one light-emitting means is a light-emitting diode.

3. The self-illuminating pedal assembly as claimed in claim 1, wherein the magnet is a ring magnet securely mounted around the pedal axle.

4. The self-illuminating pedal assembly as claimed in claim 1, wherein an inner periphery defining the compartment includes at least one positioning groove, the permanent-magnet coil including at least one protrusion on an outer periphery thereof for engaging with said at least one positioning groove.

5. The self-illuminating pedal assembly as claimed in claim 4, wherein the pedal axle includes an end engaging with a crank of a bicycle.

6. The self-illuminating pedal assembly as claimed in claim 5, wherein the pedal axle further includes a flange, with the self-illuminating pedal assembly further comprising a cover mounted around the pedal axle, the cover having a side bearing against the flange and including a pair of holed ears, the pedal having two holed lugs, two screws being respectively extended through the holed ears and the holed lugs, thereby housing the permanent-magnet coil and the ring magnet.

7. The self-illuminating pedal assembly as claimed in claim 1, wherein the pedal axle includes an end engaging with a crank of a bicycle.

8. A self-illuminating pedal assembly comprising:

a pedal axle;

a pedal rotatably mounted around the pedal axle;

at least one light-emitting means being mounted to the pedal;

a magnet securely mounted to the pedal axle; and a permanent-magnet coil securely mounted to the pedal to rotate therewith, with the permanent-magnet coil being electrically connected to said at least one light-emitting means, with the pedal including a compartment for securely receiving the permanent-magnet coil;

wherein when pedaling, the permanent-magnet coil is rotated relative to the magnet to thereby generate an alternating magnetic field to cause illumination of said at least one light-emitting means, wherein an inner periphery defining the compartment includes at least one positioning groove, the permanent-magnet coil including at least one protrusion on an outer periphery thereof for engaging with said at least one positioning groove.

9. The self-illuminating pedal assembly as claimed in claim 8, with the pedal including a longitudinal through-hole through which the pedal axle extends.

10. The self-illuminating pedal assembly as claimed in claim 9, wherein the longitudinal through-hole includes two ends each having an enlarged receiving portion for receiving a bearing through which the pedal axle extends.

11. A self-illuminating pedal assembly comprising:

a pedal axle including a first end and a second end;

a pedal rotatably mounted around the pedal axle;

at least one light-emitting means mounted to the pedal;

a magnet secured to the pedal and mounted adjacent to the first end of the pedal axle; and a permanent-magnet coil securely mounted to the pedal to rotate therewith, with the permanent-magnet coil being electrically connected to said at least one light-emitting means, with the permanent-magnet coil being in the form of a ring including a central hole, with the permanent-magnet coil surrounding the magnet, with the magnet being received in the central hole of the permanent-magnet coil, with the permanent-magnet coil rotating relative to the magnet when pedaling generating an alternating magnetic field to cause illumination of said at least one light-emitting means.

12. The self-illuminating pedal assembly as claimed in claim 11, with the magnet being a ring magnet including a central hole, with the pedal axle extending through the central hole of the ring magnet, with the ring magnet securely mounted around the pedal axle.

13. The self-illuminating pedal assembly as claimed in claim 12, with the pedal axle including a flange adjacent the first end, with the flange being intermediate the first end and the magnet, with the first end being threaded for connection with a crank of a bicycle, with the flange including flat surfaces for accepting a wrench for threading the first end into the crank of the bicycle.

14. The self-illuminating pedal assembly as claimed in claim 13, with the pedal including a compartment for securely receiving the permanent-magnet coil.

15. The self-illuminating pedal assembly as claimed in claim 14, with the pedal including a longitudinal through-hole through which the pedal axle extends, with the longitudinal through-hole including first and second ends each having an enlarged receiving portion for receiving a bearing through which the pedal axle extends, with the enlarged receiving portion of the first end of the longitudinal through-hole extending into the compartment and located intermediate the enlarged receiving portion of the second end of the longitudinal through-hole and the compartment.

16. The self-illuminating pedal assembly as claimed in claim 15, further comprising:

a cover including a central hole for receiving the pedal axle, with the cover enclosing the compartment, with the cover including a pair of holes, with the pedal having two holed lugs on diametric opposite sides of the longitudinal through-hole of the pedal, with the pedal including at least one surface receiving the foot of the bicyclist, with the two holed lugs being equally spaced from the one surface of the pedal; and first and second screws extending through the holes of the cover and threadably received in the associated lug of the pedal.

17. The self-illuminating pedal assembly as claimed in claim 16, with the compartment including a continuous wall of a size and shape corresponding to the permanent-magnet coil, with the compartment and cover housing the permanent-magnet coil and the magnet, with the continuous wall including the two holed lugs radially extending outwardly of the continuous wall.

18. The self-illuminating pedal assembly as claimed in claim 14, wherein an inner periphery defining the compartment includes at least one positioning groove, the permanent-magnet coil including at least one protrusion on an outer periphery thereof for engaging with said at least one positioning groove.

19. The self-illuminating pedal assembly as claimed in claim 11, with the pedal including a compartment for securely receiving the permanent-magnet coil, with the pedal including a longitudinal through-hole through which the pedal axle extends, with the longitudinal through-hole including first and second ends each having an enlarged receiving portion for receiving a bearing through which the pedal axle extends, with the enlarged receiving portion of the first end of the longitudinal through-hole extending into the compartment and being intermediate the second end of the longitudinal through-hole and the compartment.

20. The self-illuminating pedal assembly as claimed in claim 19, further comprising:

a cover including a central hole for receiving the pedal axle, with the cover enclosing the compartment, with the cover including a pair of holes, with the pedal having two holed lugs on diametric opposite sides of the longitudinal through-hole of the pedal, with the pedal including at least one surface receiving the foot of the bicyclist, with the two holed lugs being equally spaced from the one surface of the pedal; and first and second screws extending through the holes of the cover and threadably received in the associated lug of the pedal.

21. Self-illuminating pedal assembly comprising:

a pedal defining first and second parallel foot engaging surfaces, first and second end edges, and first and second side edges, with the first and second foot engaging surfaces being spaced a distance;

a pedal axle extending through the first and second end edges of the pedal and intermediate the first and second foot engaging surfaces and intermediate the first and second side edges, with the pedal rotatably mounted around the pedal axle;

a permanent-magnet coil;

a compartment formed on the first end edge of the pedal for receiving the permanent-magnet coil, with the pedal axle extending through the compartment, with the compartment having a dimension perpendicular to the foot engaging surfaces greater than the distance, with the compartment extending radially beyond the first and second foot engaging surfaces;

at least one light-emitting means mounted to one of the edges of the pedal, with the permanent-magnet coil being electrically connected to said at least one light-emitting means, and a magnet securely mounted to the pedal axle and received in the compartment, with the permanent-magnet coil rotated relative to the magnet when pedaling generating an alternate magnetic field to cause illumination of said at least one light-emitting means.

22. The self-illuminating pedal assembly as claimed in claim 21, with the pedal axle having a first end and a second end, with the first end of the pedal axle being threaded for connection with a crank of a bicycle, with the first end of the pedal axle being adjacent to the compartment and to the magnet, with the second end of the pedal axle being adjacent to the second end edge.

23. The self-illuminating pedal assembly as claimed in claim 22, with the permanent-magnet coil being in the form of a ring including a central hole, with the magnet being received in the central hole of the permanent-magnet coil, with the permanent-magnet coil surrounding the magnet.

24. The self-illuminating pedal assembly as claimed in claim 23, further comprising:

a cover including a central hole for receiving the pedal axle, with the cover enclosing the compartment, with the cover including a pair of holes, with the pedal having two holed lugs on diametric opposite sides of the pedal axle, with the two holed lugs being intermediate the first and second foot engaging surfaces; and first and second screws extending through the holes of the cover and threadably received in the associated lug of the pedal.

25. The self-illuminating pedal assembly as claimed in claim 24, with the compartment including a continuous wall of a size and shape corresponding to the permanent-magnet coil, with the compartment and cover housing the permanent-magnet coil and the magnet, with the continuous wall including the two holed lugs radially extending outwardly of the continuous wall.

26. The self-illuminating pedal assembly as claimed in claim 21, with the first and second foot engaging surfaces including lips extending beyond the first side edge, with the lips of the first and second foot engaging surfaces and the first side edge defining a U-shaped channel, with said at least one light-emitting means located in the U-shaped channel intermediate the lips of the first and second foot engaging surfaces and being within the outward extent of the lips beyond the first side edge.

27. The self illuminating pedal assembly as claimed in claim 26, with said at least one light-emitting means being mounted directly to the first side edge, with the first side edge including a bore, with said at least one light-emitting means being slideably received in the bore and extending beyond the bore and the first side edge.

* * * * *